United States Patent
Pai et al.

(10) Patent No.: US 8,347,277 B2
(45) Date of Patent: Jan. 1, 2013

(54) VERIFYING THAT BINARY OBJECT FILE HAS BEEN GENERATED FROM SOURCE FILES

(75) Inventors: Ramachandra N. Pai, Beaverton, OR (US); Gerrit Huizenga, Portland, OR (US); Eric B. Munson, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 1094 days.

(21) Appl. No.: 11/840,811

(22) Filed: Aug. 17, 2007

(65) Prior Publication Data

US 2009/0049430 A1    Feb. 19, 2009

(51) Int. Cl.
*G06F 9/45* (2006.01)
(52) U.S. Cl. ...................................................... 717/140
(58) Field of Classification Search .................. None
See application file for complete search history.

(56) References Cited

U.S. PATENT DOCUMENTS

| | | | |
|---|---|---|---|
| 6,931,549 B1 * | 8/2005 | Ananda ........................... 726/26 |
| 2002/0087959 A1 * | 7/2002 | Mangold et al. .............. 717/168 |
| 2005/0015760 A1 * | 1/2005 | Ivanov et al. ................. 717/168 |
| 2005/0257205 A1 * | 11/2005 | Costea et al. ................. 717/168 |
| 2005/0262353 A1 * | 11/2005 | Gentry et al. ................. 713/176 |
| 2005/0283439 A1 * | 12/2005 | Fenton ............................ 705/51 |
| 2006/0064593 A1 * | 3/2006 | Dobranski .................... 713/176 |
| 2006/0123403 A1 * | 6/2006 | Bruecklmayr et al. ....... 717/136 |
| 2006/0126468 A1 * | 6/2006 | McGovern et al. .......... 369/53.1 |
| 2006/0167814 A1 * | 7/2006 | Peinado et al. ................. 705/59 |
| 2007/0016888 A1 * | 1/2007 | Webb ............................ 717/106 |
| 2007/0143618 A1 * | 6/2007 | Sperry .......................... 713/176 |
| 2007/0245323 A1 * | 10/2007 | Bertelrud ..................... 717/140 |

* cited by examiner

*Primary Examiner* — Wei Zhen
*Assistant Examiner* — Adam R Banes
(74) *Attorney, Agent, or Firm* — Steven L. Bennett (57) ABSTRACT

For a source file on which basis a binary object file has been generated, a digital signature is generated for the source file, and the digital signature is stored. The digital signature may be secure hash algorithm (SHA) hash values. The binary object file is output. To verify that the binary object file has been generated from the source file, a digital signature is generated for the source file, and compared to the digital signature for the source file as previously stored. Where the digital signature for the source file as has been generated matches the digital signature for the source file previously stored, the binary object file is indicated as having been generated from the source file.

6 Claims, 5 Drawing Sheets

FIG 1

VERIFYING THAT BINARY OBJECT FILE HAS BEEN GENERATED FROM SOURCE FILES

FIELD OF THE INVENTION

The present invention relates generally to binary object files that are generated from source files, and more particularly to verifying whether a binary file has been generated from a particular set of source files.

BACKGROUND OF THE INVENTION

The software development process of a computer program entails one or more developers writing source files. The source files of the computer program are written in a textual format, in a given computer programming language, such as C++, or another type of computer programming language. Once the source files have been sufficiently developed, a binary object file is generated from the source files. For example, the source files may undergo compiling by a compiler to yield the binary object file. The binary object file may be directly executable to execute the computer program, such that it is an executable binary object file, or it may be an intermediate file, which is then parsed or interpreted, for instance, to execute the computer program.

A developer may have in his or her possession a number of source files and a binary object file that purportedly has been generated based on the source files in question. However, the developer has no easy way of knowing if the binary object file has indeed been generated from these source files, and/or whether the binary object file has been maliciously or otherwise modified after having been generated from these source files. Currently, the developer has to re-generate the binary object file from the source files provided to ensure that he or she has a binary object file that is positively based on these source files. However, this binary object generation process is circuitous where the developer already has a binary object file purportedly generated from the source files, and where he or she just wants to verify that the binary object file has indeed been generated from these source files.

For these and other reasons, there is a need for the present invention.

SUMMARY OF THE INVENTION

The present invention relates generally to verifying that a given binary object file has been generated from a given set of source files. A method of an embodiment of the invention generates a digital signature for a source file on which basis a binary object file has been generated. This digital signature is stored, and the binary object file output.

As such, a method of another embodiment of the invention generates a digital signature for a source file on which basis a binary object file has been purportedly generated, and compares the digital signature generated to a digital signature for the source file previously stored. Where the digital signatures for the source file as has been generated matches the corresponding digital signature previously stored, the method outputs that the binary object file has been verified as indeed having been generated from the source file and has not been modified since. Where the digital signature for the source file as has been generated does not match the digital signature for the source file as previously stored, the method instead outputs that the binary object file has not been generated from the source file.

Embodiments of the invention provide for advantages over the prior art. A developer can easily verify whether a provided binary object file has been generated from a provided set of source files and has subsequently not been modified. The developer can perform this verification without having to regenerate the binary object file from the source files provided, which can save the developer time. Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Verification as to whether a binary object file has been generated from a given set of source files entails two parts. First, digital signatures for the source files are generated and added to the binary object file. Second, when a developer is presented with the binary object file and the source files, he or she can have the digital signatures for the source files regenerated to determine whether they match the previously generated digital signatures stored within the binary object file.

The source files for a binary object file of a computer program are written in a textual format, in a given computer program language, such as C++, or another type of computer programming language. The binary object file may be generated from these binary object file by using a compiler. The binary object file may be directly executable to execute, or run, the computer program, such that it is an executable binary object file. Alternatively, the binary object file may be an intermediate file, which is then parsed or interpreted, for instance, to execute or run the computer program. The binary object file is typically not in a human-readable format, whereas the source files are typically in a human-readable format.

Figure 1:
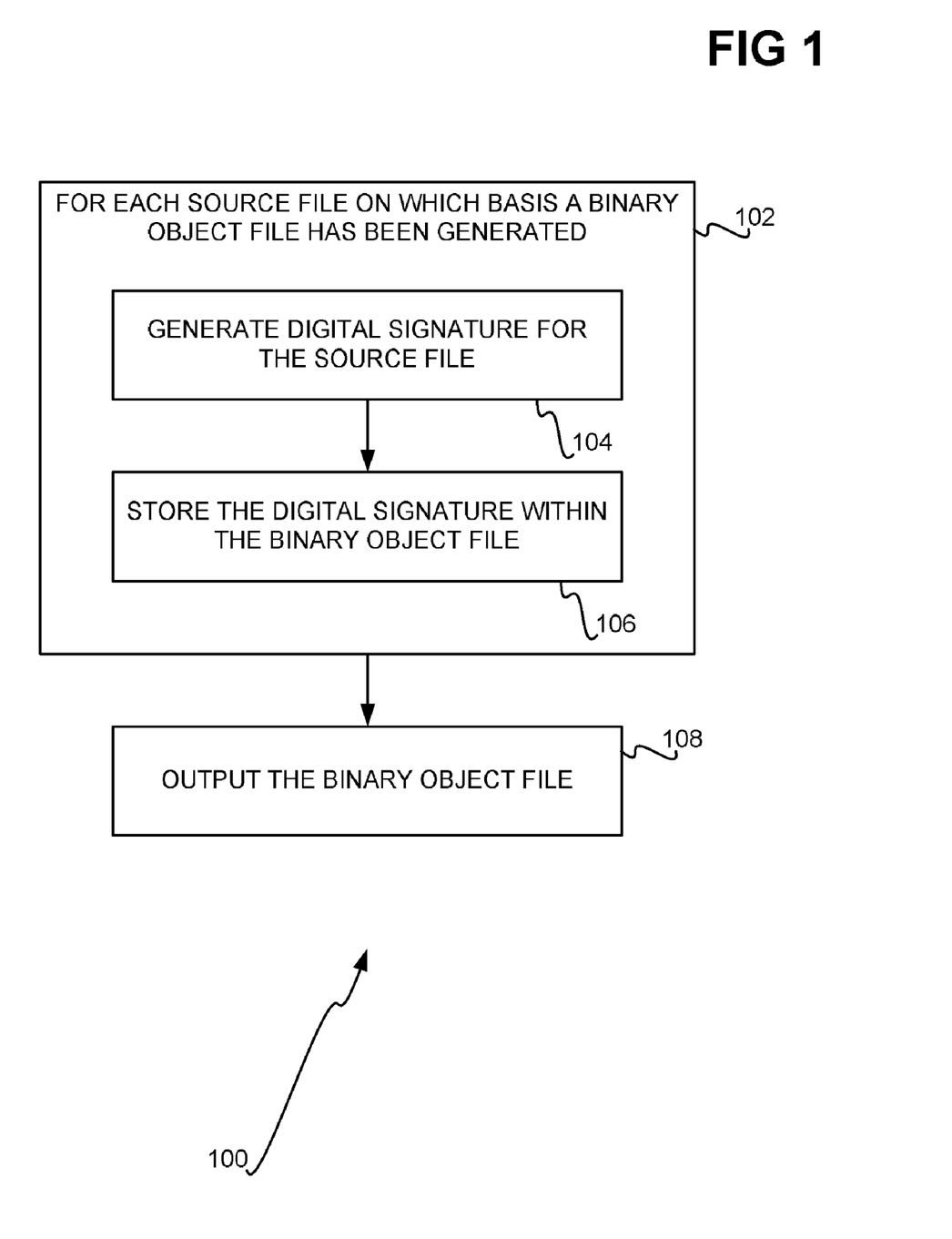
FIG. 1 is a flowchart of a method for adding digital signatures to a binary object file that correspond to the source files used to generate the binary object file, according to an embodiment of the invention.

FIG. 1 shows a method 100 for generating digital signatures for the source files on which basis a binary object file has been generated and storing these digital signatures within the binary object file, according to an embodiment of the invention. The method 100 may be performed by one or more computer programs stored on a computer-readable medium of an article of manufacture. The computer-readable medium may be a tangible computer-readable medium, such as a recordable data storage medium, or an intangible computer-readable medium, such as a modulated carrier signal. The method 100 presumes that a binary object file has been generated from the source files in question.

For each source file on which basis the binary object file has been generated, the following is performed (102). First, a digital signature is generated for the source file (104). The digital signature may be generated based on just the contents of the source file in their entirety, and may also be generated based on the filename and/or other attributes of the source file. The digital signature uniquely identifies the source file, such that if the source file is changed or modified in any way, the digital signature is at least substantially guaranteed to not be the same. In one embodiment, the digital signature may be generated as a number of hash values, as known within the art, such as by performing a secure hash algorithm (SHA), as also known within the art.

Second, the digital signature is stored within the binary object file (106). In one embodiment, the digital signature for each source file is stored within a separate section of the binary object file. It is noted that in another embodiment, the digital signature is not stored within the binary object file, but rather is stored external to the binary object file. For instance, the digital signature may be stored in a file that is separate from the binary object file.

The binary object file, within which the digital signatures for all the source files have been stored, is then output (108). For example, the binary object file may be stored on a computer-readable medium, may be electronically transmitted over a network such as the Internet, and so on. At some point, a developer retrieves or receives the binary object file and the source files on which basis the binary object file has been purportedly generated, such that the developer wishes to verify that the binary object file has indeed been generated from these source files.

It is noted that the generation and storage of the digital signature may be performed in one of at least two different situations. First, the binary object file may have already been generated. Thereafter, the digital signature may be generated, and stored within the binary object file. Second, the digital signature may be generated while the binary object file is being generated, such that the digital signature is also stored within the binary object file as the binary object file is being generated.

Figure 2:
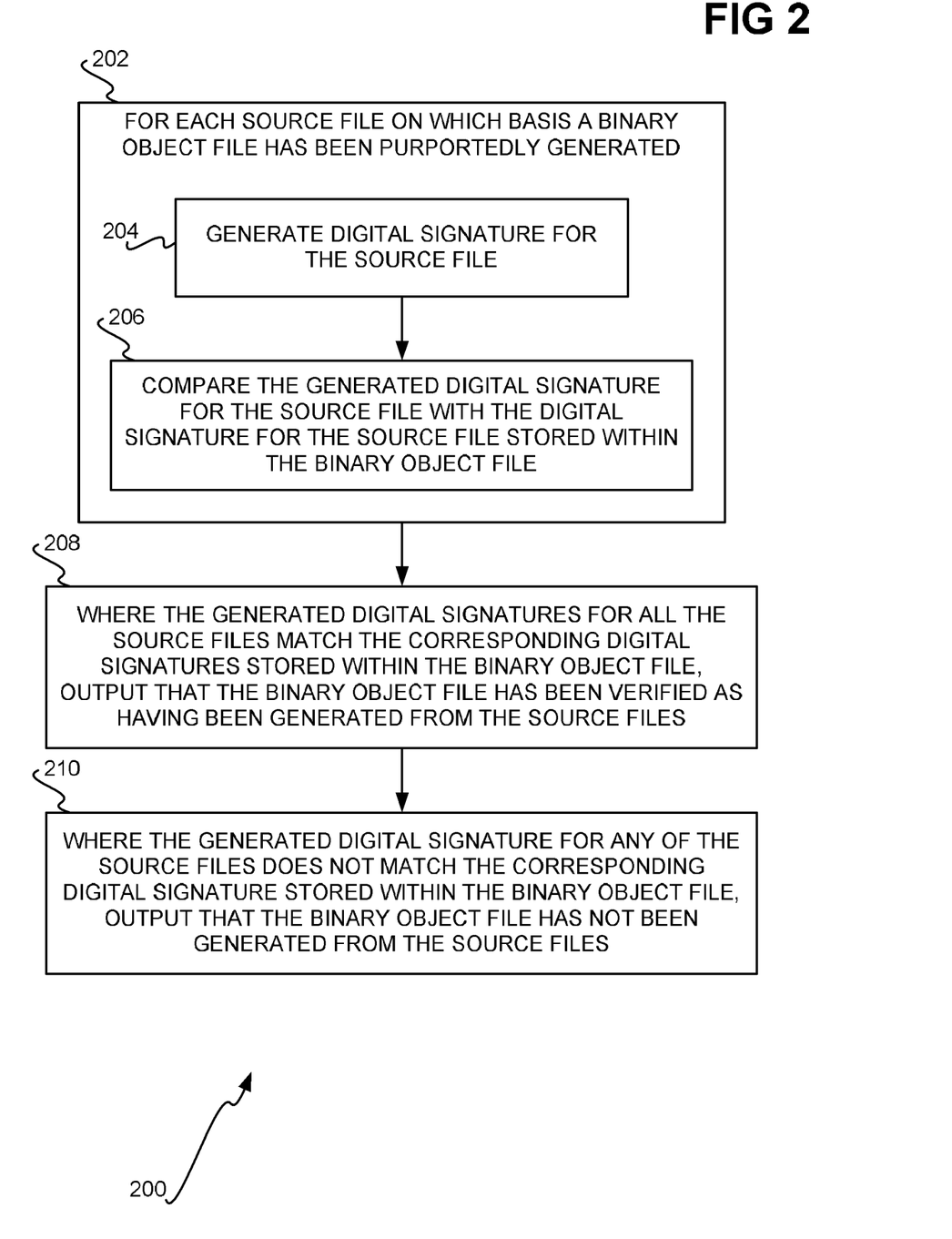
FIG. 2 is a flowchart of a method for verifying whether a binary object file has been generated from a given set of source files, based on digital signatures for the source files stored within the binary object file, according to an embodiment of the invention.

FIG. 2 shows a method 200 for verifying that the binary object file has been generated from these source files, according to an embodiment. As with the method 100 of FIG. 1, the method 200 may be performed by one or more computer programs stored on a computer-readable medium of an article of manufacture. The computer-readable medium may be a tangible computer-readable medium, such as a recordable data storage medium, or an intangible computer-readable medium, such as a modulated carrier signal. The method 200 presumes that a binary object file has been generated from the source files in question, that the source files are available, and that digital signatures for the source files have been stored within the binary object file.

For each source file on which basis the binary object file has purportedly been generated, the following is performed (202). First, a digital signature is generated for the source file (204). Desirably, the digital signature is generated for the source file in part 204 of the method 200 in the same manner by which a digital signature for the source file was generated in part 104 of the method 100. The generated digital signature for this source file is then compared to the digital signature for this source file as stored within the binary object file (206).

Therefore, where the generated digital signatures for all the source files match their corresponding digital signatures stored within the binary object file, the method 200 outputs that the binary object file has been verified as having been generated from these source files (208). By comparison, where the generated digital signature for any of the source files does not match its corresponding digital signature stored within the binary object file, the method 200 outputs that the binary object file has not been generated from the source files in question (210). This can mean that the digital signature in question stored within binary object file has been modified after generation, and/or that the source file in question has been modified after the binary object file has been generated based thereon.

The outputting of parts 208 and 210 can be achieved in a number of different ways. For instance, where the comparison of part 206 is performed by a computer program within the context of an integrated development environment (IDE) for developing computer programs, the computer program may display an appropriate text message to the user in part 206 or part 208. For example, the text message may be displayed in a dialog box, to indicate to the user that the integrity of the binary object file has not been compromised (in part 206), or that the integrity of the binary object file has been compromised (in part 208).

It is noted that embodiments of the invention are not limited to the specific manner by which digital signatures are generated and compared, as has been described in relation to the method 100 and 200 of FIGS. 1 and 2. Other types of digital signatures may also be generated, based on data other than the source files themselves. One example of such additional digital signatures being generated and compared is described later in the detailed description, in relation to FIGS. 4 and 5, to provide further assurance that a binary object file has not been compromised after generation from one or more source files written by a developer.

Technical Background

Figure 3:
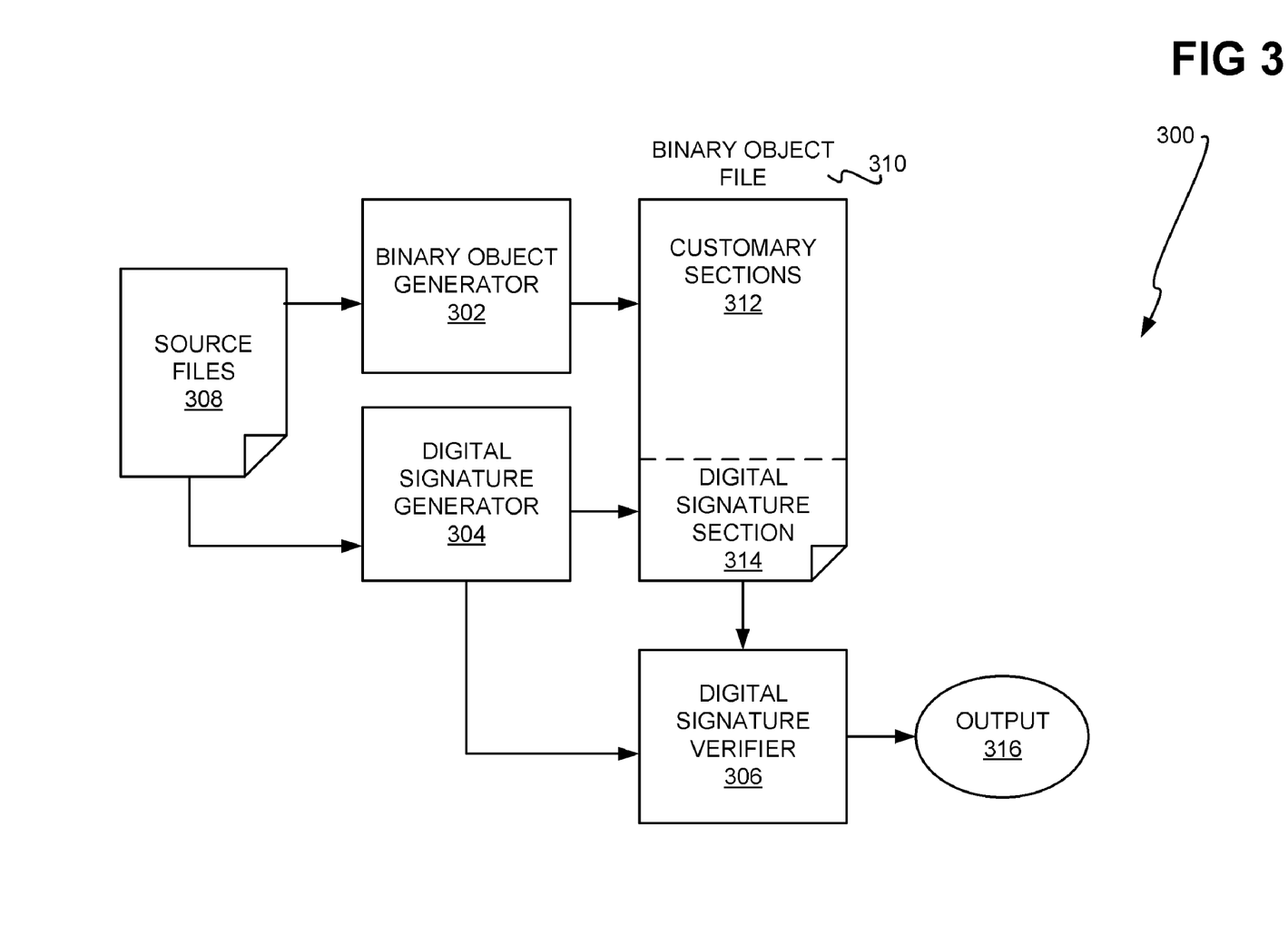
FIG. 3 is a diagram of a system in which digital signatures are generated for source files on which basis a binary object file has been generated, and in which the integrity of the binary object file is verified, according to an embodiment of the invention.

FIG. 3 shows a system 300, according to an embodiment of the invention. The system 300 includes a binary object generator 302, a digital signature generator 304, and a digital signature verifier 306. The system 300 may include other components, in addition to and/or in lieu of those depicted in FIG. 3. The system 300 may be implemented as one or more computing devices, having processors, memory, storage devices and so on. The generators 302 and 304 and the verifier 306 may each be implemented in hardware, software, or a combination of hardware and software.

The binary object generator 302 generates a binary object file 310 from the source files 208. The generation of the binary object file 310 may be as is customary. For example, a compiler may be employed to transform source code of the source files 308 into the binary object file 310, which may be directly executable or run on a computing device. The binary object generator 302 specifically generates what are referred to as the customary sections 312 of the binary object file 310. The sections 312 of the binary object file 310 are the sections that are normally generated so that the binary object file 310 can be directed executed or run, or so that the binary object file 310 can be interpreted or parsed for execution or running.

The digital signature generator 304 generates digital signatures from the source files 308 and stores the digital signatures within a digital signature section 314 of the binary object file 310. The digital signature section 314 is a section added to the binary object file 310 for the purpose of storing the digital signatures. The digital signature generator 304 may perform a secure hash algorithm (SHA) to generate the digital signature for one of the source files 308, as a string of hash values, as can be appreciated by those of ordinary skill within the art. That is, in such an embodiment, the string of hash values makes up the digital signature for the source file in question.

At some point, therefore, the binary object generator 302 has already generated the customary sections 312 of the binary object file 310 from the source files 308, and the digital signature generator 304 has already generated the digital signatures for the source files 308 and stored them in the binary object file 310. At this point in time, the binary object file 310, including the digital signatures stored within the digital signature section 314, and the source files 308 may be provided to a developer. The developer may then want to verify the integrity of the binary object file 310. For instance, the developer may then want to verify that the binary object file 310 was indeed generated from the source files 308.

Therefore, the digital signal generator 304 again generates digital signatures based on the source files 308. These digital signatures are input to the digital signature verifier 306. The digital signature verifier 306 compares the digital signatures that have been generated against the previously generated digital signatures stored in the digital signature section 314 of the binary object file 310. It is noted that the digital signatures stored in the digital signature section 314 is retrieved in one embodiment by parsing the binary object file 310, such that the file 310 is examined to locate the digital signature section 314. Once the digital signature section 314 has been located, the digital signatures stored in this section 314 are retrieved therefrom. If the generated digital signatures for all the source files 308 match their corresponding digital signatures stored within the binary object file 310, then the digital signature verifier 306 provides as output 316 that it has been verified that the binary object file 310 has indeed been generated from the source files 308 in question.

However, if the generated digital signature for any of the source files 308 does not match its corresponding digital signature stored within the binary object file 310, then the digital signature verifier 306 instead provides as output 316 that it has been determined that the binary object file 310 has not been generated from the source files 308 in question. For example, the offending source file(s) may have been modified after the binary object file 310 has been generated. In this manner, a developer is able to learn whether a given set of source files 308 indeed was the basis on which the binary object file 310 was generated, without having to regenerate the binary object file 310 from the set of source files 308 presented.

DETAILED METHODS AND CONCLUSION

Figure 4:
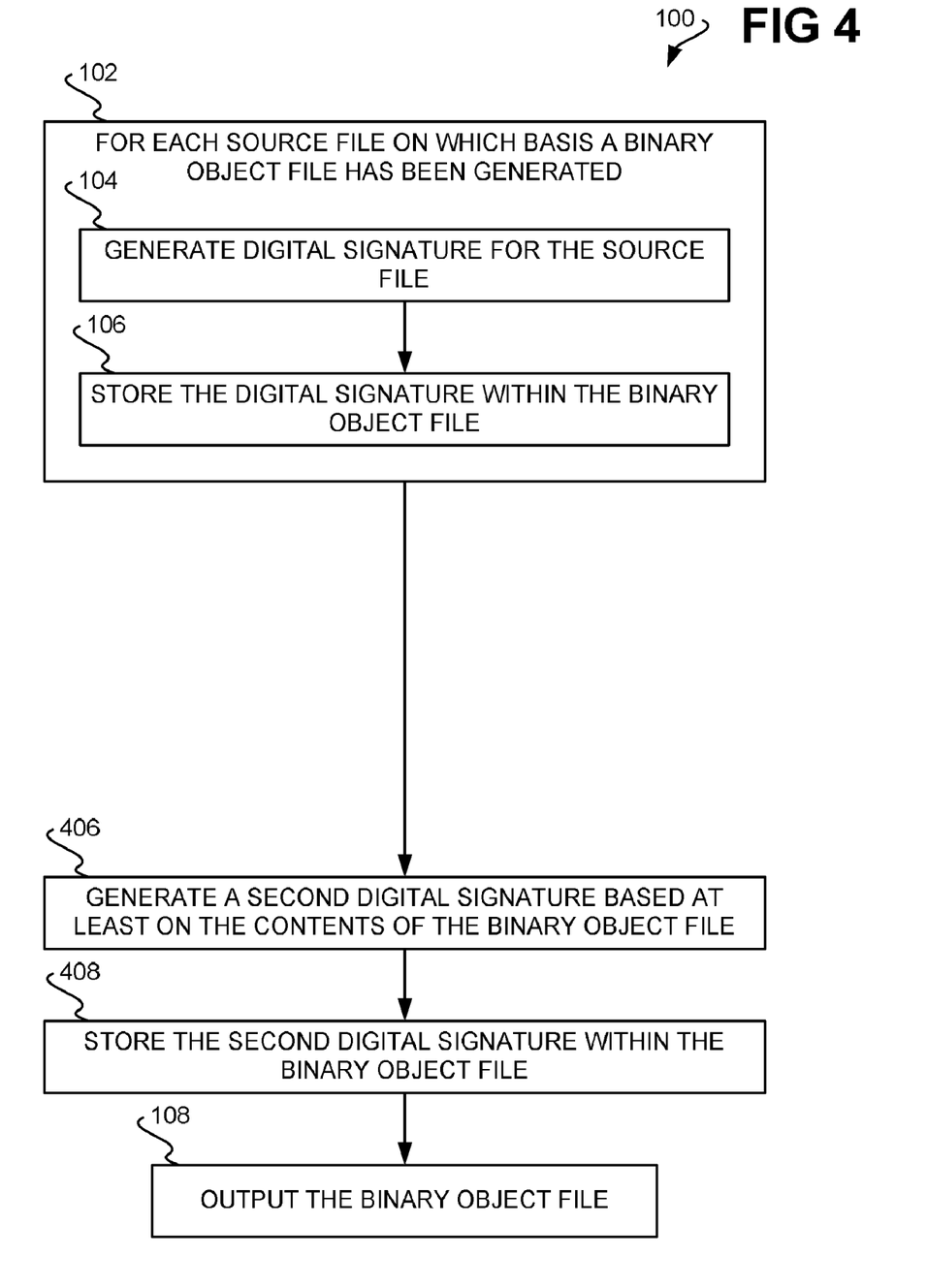
FIG. 4 is a flowchart of a method for adding digital signatures to a binary object file that at least correspond to the source files used to generate the binary object file, according to another embodiment of the invention.

FIG. 4 shows the method 100 of FIG. 1 that has been described, according to a more detailed embodiment. Parts 102, 104, and 106 of the method 100 are performed in the embodiment of FIG. 4 as have been described in relation to the embodiment of FIG. 1 Thus, for each source file on which basis a binary object file has been generated (102), a digital signature is generated for the source file (104), and stored within the binary object file (106).

It is noted that in one embodiment, just a single digital signature is stored within the binary object file in part 106. This single digital signature is generated based on the digital signatures as have been generated for all the source files. As such, this single digital signature may be considered a "meta" digital signature, in that it is a digital signature generated based on other digital signatures. For example, a secure hash algorithm (SHA) may be performed in relation to the hash values that make up the digital signatures for the source files that have already been generated, to yield hash values that make up the single digital signature. The terminology that digital signatures for the source files are stored within the binary object file encompasses the generation and storage of a single digital signature being within the binary object file, where the single digital signature is based on the digital signatures for all the individual source files.

A second digital signature may also be generated (406), based at least on the contents of the binary object file itself, such as the customary section of the binary object file, as has been described. The second digital signature ensures that verification that these contents of the binary object file have not been modified after generation of the binary object file from the source files can be achieved. An SHA may also be performed on the contents of the binary object file to yield second hash values as the second digital signature. The second digital signature, if generated, is also stored within the binary object file (408), such as within the digital signature section of the binary object file. As described in relation to the embodiment of FIG. 1, the binary object file is finally output (108).

Figure 5:
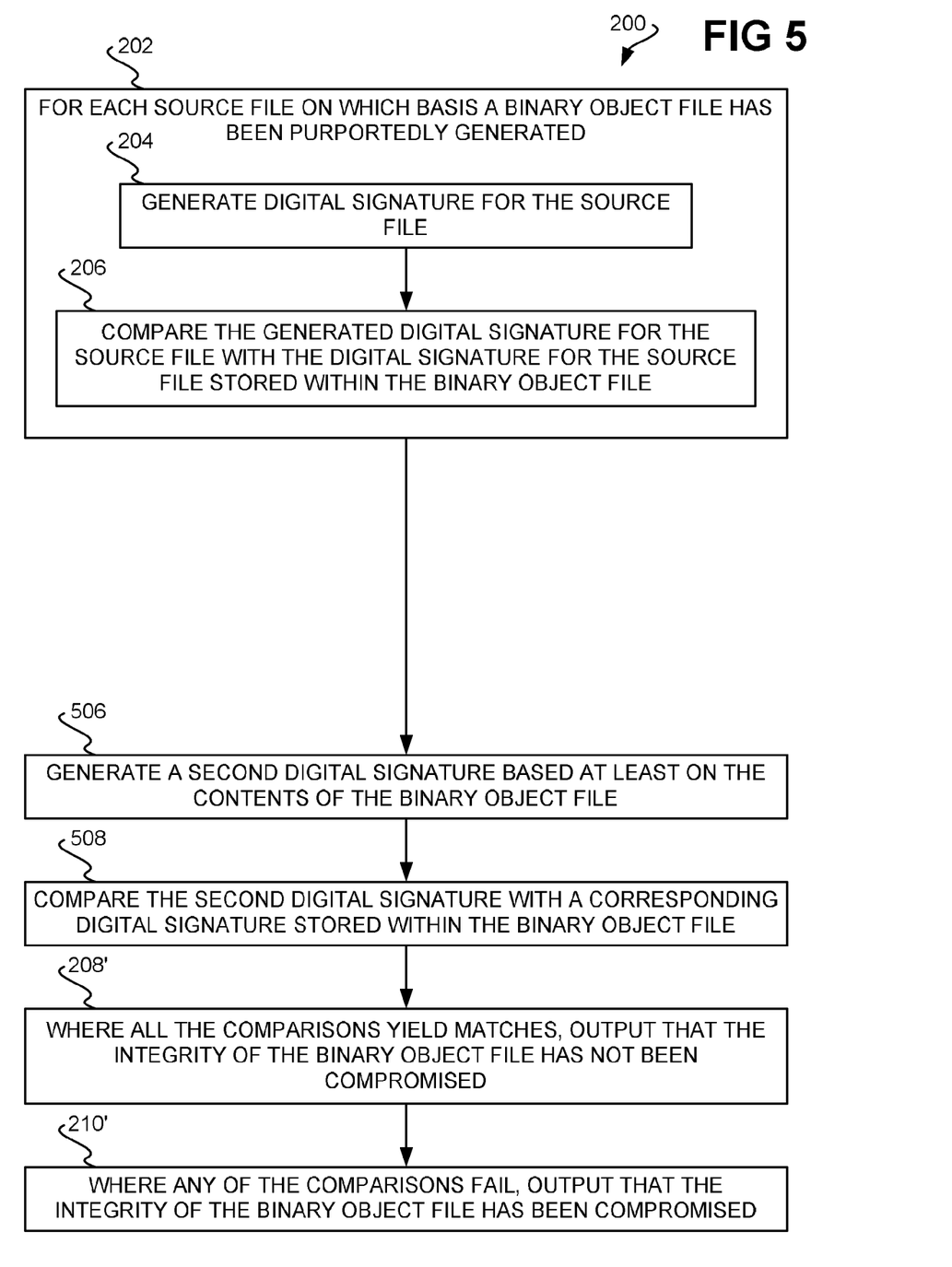
FIG. 5 is a flowchart of a method for verifying whether a binary object file has been generated from a given set of source files, based at least on digital signatures for the source files stored within the binary object file, according to another embodiment of the invention.

FIG. 5 shows the method 200 of FIG. 2 that has been described, according to a more detailed embodiment of the invention. Parts 202, 204, and 206 of the method 200 are performed in the embodiment of FIG. 5 as have been described in relation to the embodiment of FIG. 2. Thus, for each source file on which basis a binary object file has purportedly been generated (202), a digital signature is generated for the source file (204), and compared against the corresponding digital signature for the source file that was previously stored within the binary object file (206).

In one embodiment, just a single digital signature may be stored within the binary object file, based on the digital signatures as previously generated for all the source files, as has been described in relation to the method 400 of FIG. 4. In this embodiment, in part 204 a single digital signature is likewise generated based on the digital signatures as have been generated for all the source files. As such, in part 206, it is this single digital signature that is compared against the corresponding single digital signature that was previously stored within the binary object file. The terminology that digital signatures for the source files are generated and compared against their corresponding digital signatures that were previously stored within the binary object file encompasses the generation of such a single digital signature from the digital signatures as generated for all the source files, and the comparison of this single digital signature against a corresponding single digital signature that was previously stored within the binary object.

A second digital signature may also be generated (506), based at least on the contents of the binary object file itself. The second digital signature generated in part 506 corresponds to the second digital signature generated in part 406 of the method 100 of FIG. 4, and may be generated in the same manner. As such, the second digital signature generated in part 506 is compared with the corresponding (second) digital signature stored within the binary object file in part 408 of the method 100 (508).

Where all the comparisons of parts 206 and 508 yield matches, such that the digital signatures generated match the corresponding digital signatures stored within the binary object file, the method 200 outputs that the integrity of the binary object file has not been compromised (208'). This means that the binary object file has been verified as having been generated from the source files in question. This also means that the contents of the binary object file have not been modified since the binary object file was generated from these source files.

However, where any of the comparisons of parts 206, 504, and 508 fail, such that any of the digital signatures generated does not match the corresponding digital signature stored within the binary object file, the method 200 outputs that the integrity of the binary object file has been compromised (210'). This can mean that the binary object file cannot be verified as having been generated from the source files in question. This can also mean that the contents of the binary object file may have been modified since the object file was generated from these source files.

The integrity checking of the method 200 in the embodiment of FIG. 5 is thus stronger than the integrity checking of the method 200 in the embodiment of FIG. 2. In the embodiment of FIG. 2, what is verified is whether the binary object file has been generated from a provided set of source files. However, the contents of the binary object file—i.e., its customary section(s)—may still have been modified after generation of the binary object file, and such modification may not be able to be verified by the embodiment of FIG. 2. By comparison, in the embodiment of FIG. 2, the integrity of the binary object file is at least substantially completely verified. That is, whether the contents of the binary object file have been modified since generation of the binary object file is verified, as well as whether the binary object file has been generated from a provided set of source files is verified.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A method comprising:
    compiling a source file to create a binary object file, such that the binary object file is directly generated from the source file;
    generating a first digital signature for the source file, based at least on contents of the source file;
    after generating the first digital signature, storing the first digital signature within the binary object file;
    after storing the first digital signature within the binary object file, generating a second digital signature, based at least on contents of the binary object file, such that the second digital signature is based at least on the first digital signature, because the first digital signature has been stored within the binary object file prior to generation of the second digital signature;
    after generating the second digital signature, storing the second digital signature within the binary object file, such that the binary object file both includes the first digital signature for the source file from which the binary object file was created and includes the second digital signature for the binary object file itself; and,
    after storing the second digital signature within the binary object file, outputting the binary object file;
    wherein a same hash algorithm is used to generate both the first digital signature and the second digital signature,
    wherein the second digital signature is generated based on one or more customary sections of the binary object file, the one or more customary sections of the binary object file being sections that are generated from the source file so that the binary object file can be directly executed or run, or interpreted or parsed for execution or running,
    and wherein the first digital signature is a meta digital signature for the source file, the source file including a plurality of sub-source files, a different digital signature generated for each sub-source file, the meta digital signature generated based on the different digital signatures for the sub-source files by applying the same hash algorithm to the different digital signatures collectively to yield the meta digital signature.

2. The method of claim 1, wherein generating the first digital signature comprises generating secure hash algorithm (SHA) hash values for the source file based at least on contents of the source file.

3. The method of claim 1, wherein storing the first digital signature comprises storing the first digital signature for the source file within a digital signature section of the binary object file.

4. The method of claim 1, wherein the binary object file is one of a binary executable file generated based on the source file, and an intermediate object file generated based on the source file.

5. An article of manufacture comprising:
    a computer-readable medium; and,
    means in the medium for
        compiling a source file to create a binary object file, such that the binary object file is directly generated from the source file;
        generating a first digital signature for the source file, based at least on contents of the source file;
        after generating the first digital signature, storing the first digital signature within the binary object file;
        after storing the first digital signature within the binary object file, generating a second digital signature, based at least on contents of the binary object file, such that the second digital signature is based at least on the first digital signature, because the first digital signature has been stored within the binary object file prior to generation of the second digital signature;
        after generating the second digital signature, storing the second digital signature within the binary object file, such that the binary object file both includes the first digital signature for the source file from which the binary object file was created and includes the second digital signature for the binary object file itself;
    wherein a same hash algorithm is used to generate both the first digital signature and the second digital signature,
    wherein the second digital signature is generated based on one or more customary sections of the binary object file, the one or more customary sections of the binary object file being sections that are generated from the source file so that the binary object file can be directly executed or run, or interpreted or parsed for execution or running, and wherein the first digital signature is a meta digital signature for the source file, the source file including a plurality of sub-source files, a different digital signature generated for each sub-source file, the meta digital signature generated based on the different digital signatures for the sub-source files by applying the same hash algorithm to the different digital signatures collectively to yield the meta digital signature.

6. The article of claim 5, wherein the binary object file is one of a binary executable file generated based on the source files, and an intermediate object file generated based on the source files.

* * * * *